United States Patent [19]

Stockton

[11] Patent Number: 4,615,227
[45] Date of Patent: Oct. 7, 1986

[54] ENGINE STARTER AND ACCESSORY DRIVE SYSTEM

[75] Inventor: Thomas R. Stockton, Ann Arbor, Mich.

[73] Assignee: Ford Motor Company, Dearborn, Mich.

[21] Appl. No.: 663,536

[22] Filed: Oct. 22, 1984

[51] Int. Cl.[4] ............................................. F02N 15/02
[52] U.S. Cl. ..................................... 74/7 E; 74/7 R; 74/7 C; 74/752 A; 74/785
[58] Field of Search ............... 74/6, 7 R, 7 C, 7 E, 74/752 A, 752 C, 752 D, 785; 123/179 D

[56] References Cited

U.S. PATENT DOCUMENTS

| | | | |
|---|---|---|---|
| 2,335,186 | 11/1943 | Jackson | 123/179 D X |
| 2,771,067 | 11/1956 | Nardone | 74/785 X |
| 2,782,644 | 2/1957 | Wiseman | 74/7 |
| 2,972,911 | 2/1961 | Volk, Jr. et al. | 74/810 |
| 3,077,796 | 2/1963 | Johnson et al. | 74/785 X |
| 3,362,256 | 1/1968 | Cluff et al. | 74/785 X |
| 3,428,034 | 2/1969 | MacAfee et al. | 123/179 |
| 3,602,798 | 8/1971 | Shibata et al. | 322/93 |
| 3,727,733 | 4/1973 | Mrazek | 192/42 |
| 4,062,419 | 12/1977 | Kadota | 180/70 R |
| 4,080,843 | 3/1978 | Underwood | 74/336 R |
| 4,257,281 | 3/1981 | Bunger | 74/6 |
| 4,265,135 | 5/1981 | Smirl | 74/336 B |
| 4,305,488 | 12/1981 | McIntosh | 192/4 A |
| 4,362,133 | 12/1982 | Malik | 123/179 K |

*Primary Examiner*—Allan D. Herrmann
*Attorney, Agent, or Firm*—Frank G. McKenzie; Donald J. Harrington

[57] ABSTRACT

The starting system for an internal combustion engine includes a crankshaft and a camshaft sprocket which form the carrier for a planet pinion set whose elements are continuously engaged with a sun gear mounted and a ring gear mounted by a one-way brake to the engine block. A starting motor is connected by an endless chain or belt to a sprocket connected by a one-way driving connection to the sun gear. An accessory drive pulley and the rotor of the engine oil pump are continuously and directly connected to the sun gear. A hydraulic piston, actuated by engine oil pressure, selectively breaks the ring gear when engine speed is below a predetermined value provided engine oil pressure is at least equal to a predetermined pressure and releases the ring gear when engine speed exceeds the predetermined speed.

11 Claims, 3 Drawing Figures

ENGINE STARTER AND ACCESSORY DRIVE SYSTEM

BACKGROUND OF THE INVENTION

1. Field of the Invention

This invention generally pertains to engine starters and more particularly relates to starters for engines having an accessory driven by the engine.

2. Description of the Prior Art

It is common practice to have the engine of a motor vehicle drive accessories, such as air conditioning compressors and electric generators, when the engine reaches its operating speed. In the prior art, some elements of the engine starter gearing are used to drive the accessories instead of having a gear system located between the starter and accessory dedicated solely to driving the starter. A system of this type, described in U.S. Pat. No. 4,572,281, power developed at the input gear of a first gear stage drives the input gear of a second gear stage, which causes an output drive member coupled to the engine to start the engine. When the engine reaches its operating speed, the power input to the first stage declines but the engine continues to drive the output drive member of the second gear stage which drives an accessory shaft. In this arrangement, the second gear stage of the starter works to start the engine and drive the accessory shaft.

A three-phase accessory drive, described in U.S. Pat. No. 4,265,135, produces a high drive ratio over a low speed engine range, a constant speed over an intermediate speed range, and a low drive ratio over a range of engine speeds greater than the intermediate range. This drive system includes a planetary gear set, a friction brake, a one-way clutch and a hydraulic system. The planet gears are driven from the engine crankshaft, the ring gear is connected by pulleys to the accessories and the sun gear is connected to the friction brake. The hydraulic system includes an orifice controlled by a bimetallic element and a pump driven by the ring gear so that the fluid pressure varies with engine speed in a cylinder whose piston is connected to the brake caliper. The brake holds the sun gear stationary and the speed of the accessory pulley mounted on the ring gear increases linearly with engine speed. When the speed of the ring gear increases to a first predetermined speed, fluid pressure increases more rapidly thereby permitting the brake and sun gear to rotate and maintain the ring gear speed constant until the speed of the sun gear reaches that of the carrier. When the sun gear speed exceeds the speed of the carrier, the one-way clutch connects them and the accessory pulleys rotate at the engine speed.

SUMMARY OF THE INVENTION

It is preferable in an engine start, restart and accessory drive system that, in the interest of fuel economy, the accessory pulley be overdriven when engine speed is below the first predetermined speed and then, when engine speed exceeds the predetermined speed, the accessories be driven at engine speed.

The engine starter and accessory drive system according to this invention includes a starter motor, which is energized according to the state of an ignition switch and the position of an accelerator pedal. When the ignition switch is turned to the start position, the motor is energized. When the ignition switch is in the operating position and the accelerator pedal is depressed at least partially, the motor is energized. But in all other conditions the motor is disconnected from the power source.

A planetary gearset includes a sun gear, driveably connected through a one-way clutch to a sprocket wheel driven by the starting motor, a set of planet pinions rotatably mounted on a carrier formed integrally with the engine crankshaft and a sprocket wheel driveably connected to the camshaft, and a ring gear connected alternately by a one-way clutch to the engine block or a hydraulically actuated brake.

The speed of the engine crankshaft and the pressure of a hydraulic circuit supplied from the engine oil pump are used to produce electrical signals indicative of the engine speed and the hydraulic pressure. These signals are applied to an input conditioning circuit whose output is applied to the input ports of a computer, which processes the information and produces an output signal that is used to control the state of a solenoid operated control valve. The control valve is connected to a hydraulic circuit which includes a cylinder whose piston actuates a rotatably mounted lever adapted to apply an amplified force to the brake that selectively holds the ring gear. The logic on the basis of which the microprocessor produces its output signal is stored in electronic memory accessible to the computer from which an algorithm is recalled and executed repetitively by the computer. According to this logic, when engine speed is greater than a first predetermined value, the hydraulic cylinder is vented through operation of the solenoid valve. If engine speed is lower than the predetermined speed and if cylinder pressure is less than a first predetermined pressure, this cylinder is vented, but if engine speed is less than the first predetermined speed and cylinder pressure is not less than the first predetermined pressure, the cylinder is pressurized and the caliper brake applied.

DESCRIPTION OF THE PREFERRED EMBODIMENT

Figure 1:
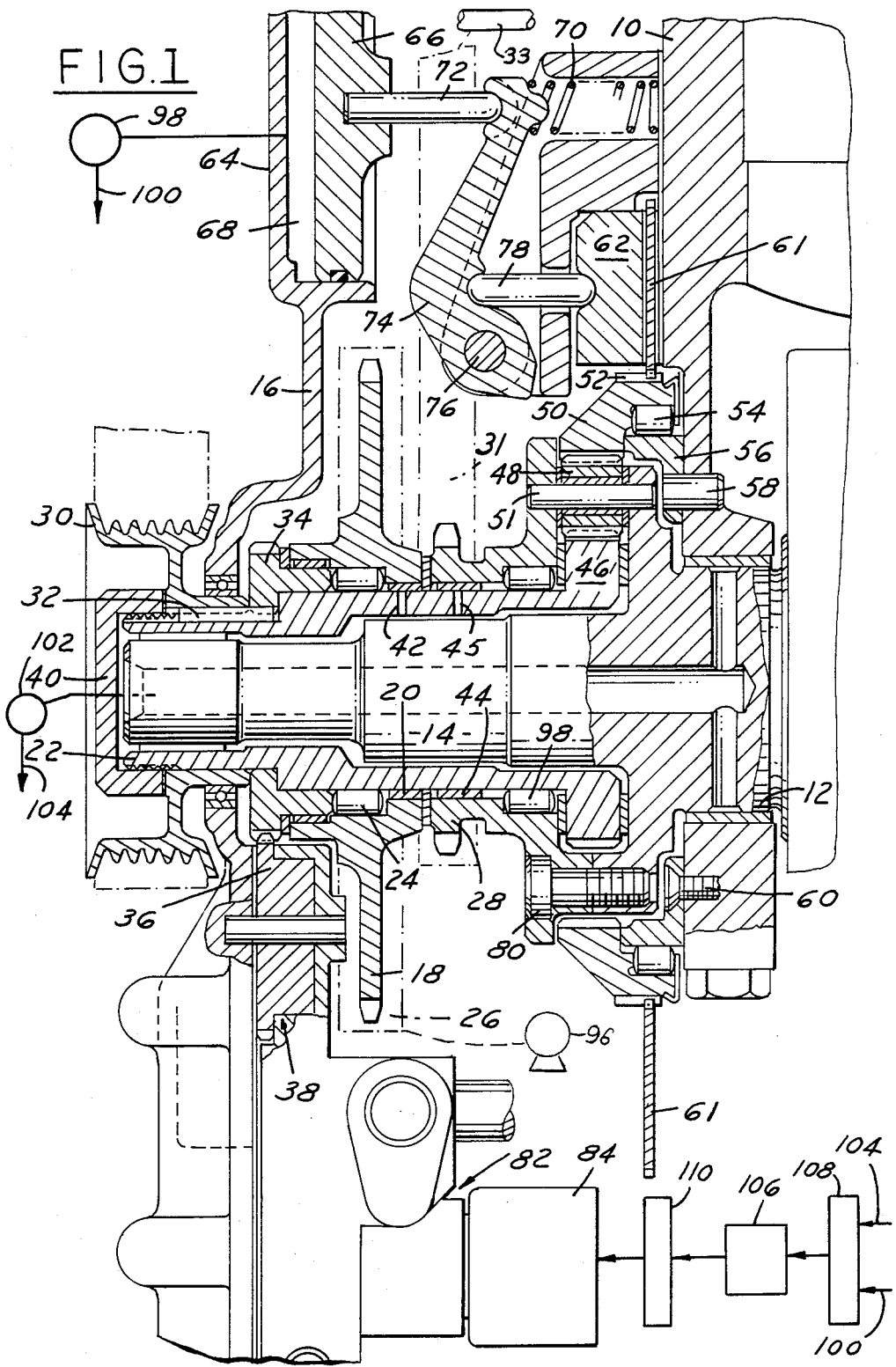
FIG. 1 is a cross section through the center line of the engine crankshaft showing an accessory drive pulley, gearset and brake actuator for use with a system according to this invention.

The block 10 of an internal combustion engine with which the starter and accessory drive system of this invention can be used has an opening 12 through which the engine crankshaft 14 extends. The block and housing 16 define a space between them where the components of this invention are located. A first sprocket wheel 18 is mounted on bearings 20 for relative rotational movement with respect to a shaft 22 on a first overrunning clutch 24, which provides a one-way driving connection between sprocket 18 and shaft 22. The teeth of the sprocket are engaged by an endless belt or chain 26 which is driven by its engagement with a similar sprocket wheel, preferably one sized to produce a reduction of sprocket 18, carried on a shaft of an electric starting motor.

A second sprocket wheel 28 has teeth formed on its outer periphery engaged by an endless belt or chain 31 driveably connected to the camshaft 33 of the engine.

Located outside of housing 16 on shaft 22 is an accessory drive pulley 30 connected to the shaft by a key 32 fitted within a keyway in the shaft and extending axially beyond pulley 30 so that a portion of the key is driveably engaged with the inner teeth of gear wheel 34, whose outer teeth drive the rotor 36 of an engine oil pump 38. A cap 40 hydraulically seals the annular region between the inner surface of shaft 22 and the outer surface of crankshaft 14. This annular region is pressurized by the pump and is connected by radially directed ports 42, 45 which communicate hydraulic fluid radially outward to the bearings 20, 44 which support sprocket wheels 18 and 28.

The end of shaft 22 is formed with a sun gear 46, which is in continuous meshing engagement with a set of planet pinions 48, each pinion being supported on a pin 51 carried, at one axial end, on the crankshaft and, at the opposite axis end on a flanged portion of sprocket wheel 28. Overrunning clutch 98 permits a one-way driving connection between shaft 22 and sprocket wheel 28. The planet pinions are in continuous meshing engagement with ring gear 50, which has an external spline 52 formed upon its outer periphery and is supported in rotation on a one-way clutch 54, whose outer race is the surface of the ring gear and whose inner race 56 is connected to the engine block by dowel pins 58 and machine screws 60. Dowels 58 locate the inner race of clutch 54 on the block and transmit the principal portion of the torque transmitted by the clutch because of the close fit between the diameter of the dowel and the hole in the inner race in which the dowels are fitted. The machine screws 60 produce an axially clamping force between the inner race of the clutch and the engine block. Clutch 54 provides a one-way driving connection between ring gear 50 and and the engine block.

The rotor disk 61 of a caliper brake is located between brake surfaces located on the outer face of the engine block and the inner face of a pressure plate 62. A cylinder 64 formed integrally with housing 16 is connected hydraulically to the output side of engine pump 38 and receives a piston 66 that moves toward the engine block when the cylinder is pressurized and moves toward housing 16 due to the effect of the return spring 70 when the cylinder is vented. The piston carries the pin 72, which is held in contact with the end of a lever 74 mounted for rotation at a pivot 76. A second pin 78 is located between the outer surface of pressure plate 62 and the lever. In this way, the hydraulic force produced on the piston and transmitted to the lever is amplified and applied to the caliper brake due to the mechanical advantage inherent in this arrangement.

A bolt pattern, of which bolt 80 is a member, mechanically connects the flange of crankshaft 14 to the flange of sprocket wheel 28, thereby forming the planet pinion carrier that support pinions 48 on pins 51.

A hydraulic control body 82 includes a solenoid-operated valve 84 which alternately vents and seals cylinder 68 according to the output produced by a control system responsive to engine speed and hydraulic pressure.

Figure 2:
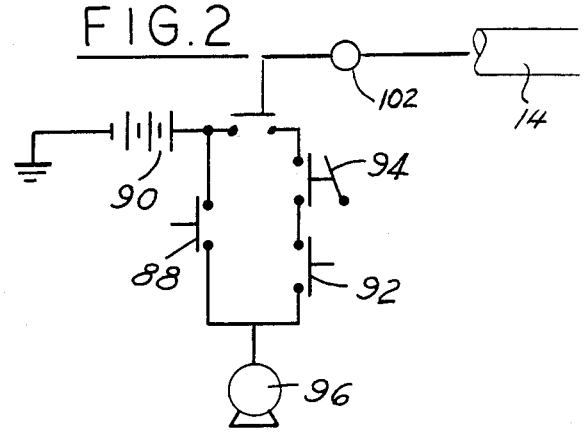
FIG. 2 is an example of a logic circuit for connecting a starter motor to an electrical power source.
Figure 3:
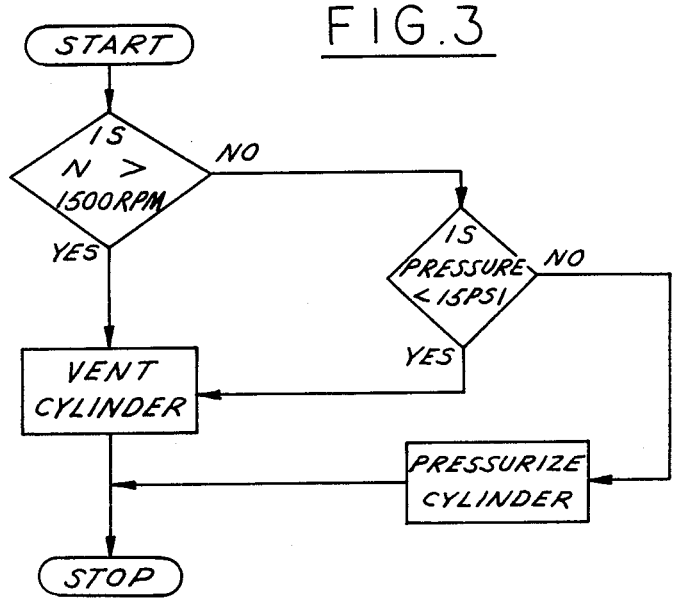
FIG. 3 is an example of a logic flow diagram from which an algorithm executed by a computer controls a solenoid valve.

Referring now to FIGS. 2 and 3, the control circuit for the starting motor 96 includes an ignition switch having at least two positions including a START position 88, at which a source of dc electric power, such as a battery 90, is connected to the motor, and an ON position 92, to which the switch returns automatically from the START position. The control circuit further includes, in series with the RUN position of the ignition switch, a switch responsive to the position of the accelerator pedal 94, which closes the circuit between the battery and the starting motor if the ignition switch is in the RUN position and the accelerator pedal is depressed. The state of switch 95 is controlled by a signal from tachometer 102 so that it opens the circuit when engine speed rises to about 1000 rpm. and closes when the engine speed falls below that speed. Therefore, the starter motor is connected to battery 90 when pedal switch 94 is closed while accelerating the vehicle. When engine speed reaches 1000 rpm., the motor is disconnected from the battery.

In operation, with the engine stopped and at least one of the electrical circuits connecting the battery to the motor closed, sprocket wheel 18 is driven by the starting motor at the speed ratio that results from the diameters of sprocket 18 and of the corresponding sprocket carried on the motor shaft. Sprocket wheel 18 drives shaft 22, pulley 30 and sun gear 46 through one-way 24. However, ring gear 50 is held and fixed to the engine block through operation of one-way clutch 54. Therefore, crankshaft 14 is driven because the planet pinions turn on the surface of the ring gear and drive the carrier formed by the crankshaft and sprocket wheel 28. Crankshaft 14 rotates about its axis and the camshaft is driven by the endless chain belt 31 from sprocket wheel 28. The crankshaft is turned at a speed ratio that is the sum of the ratios of the gearset and of the starting motor sprocket-sprocket-wheel 18 ratio. The accessory drive pulley 30 turns at the speed of sprocket wheel 18 with the reduction ratio associated with the chain drive between the starting motor and wheel 18. Similarly, the rotor of the engine pump 38 is driven by the starting motor through clutch 24, shaft 22 and gear wheel 34.

After the engine starts, engine oil pressure rises. When this pressure reaches or exceeds approximately 15 psi., the space within cylinder 64 above piston 66 is pressured and a pressure force developed on the face of the piston is applied to lever 74 causing it to rotate about pivot 76 and to apply an amplified force on the pressure plate of the caliper disk brake. When the brake is applied in this way, sun gear 46 is overdriven in relation to the engine speed by a factor equal to $1+R/S$, where R is the diameter of the ring gear and S is the diameter of the sun gear. Sprocket wheel 28 turns at the speed of the crankshaft and drives the camshaft at the speed determined by the diameters of sprocket wheel 28 and of the sprocket wheel located on the camshaft. Sprocket wheel 18 overruns because its inner race, shaft 22, is its driven component, and the accessory drive pulley 30 is overdriven at the same speed as sun gear 46. Similarly, the rotor of pump 38 is driven through key 32 and gear wheel 34 from shaft 22.

When engine speed reaches 1500 rpm; solenoid valve 84 vents cylinder 68 and piston 66 returns to the top of this cylinder due to the action of return spring 70. This causes lever 74 to rotate out of engagement with pressure plate 62 and disengages the caliper brake. When this occurs, none of the components of the gearset are fixed because clutches 54 and 58 overrun; therefore, rotation of the crankshaft causes the sun gear 46, wheel 28 and shaft 22 to turn at engine speed. Sprocket wheel 18 does not turn because the inner race of one-way clutch 24 is its driving component, the rotor of pump 38 is driven through key 32 and gear wheel 34, and accessory pulley 30 turns at the same speed as the engine.

The drive arrangement of this invention, therefore, overdrives the accessory pulley when engine speed is less than 1500 rpm., provided engine oil pressure is greater than 15 psi., and turns the accessory pulley at engine speed when the engine speed exceeds 1500 rpm.

A pressure sensor 99 located in the engine oil system produces an electrical signal on line 100 indicative of the magnitude of engine oil pressure. A tachometer 102 produces an electrical signal on line 104 indicative of the speed of crankshaft 14. Lines 100, 104 are connected through an input conditioning circuit 108 to the input ports of a microprocessor 106, adapted to produce from output conditioning circuit 110 an electrical current that energizes and de-energizes the coils of solenoid valve 84 in order to vent and pressurize cylinder 64 in accordance with the logic set out in FIG. 3.

Having thus described the preferred embodiments of my invention, what I claim and desire to secure by U.S. Letters Patent is:

1. An engine starter and accessory drive system comprising:
    an accessory drive means;
    a planetary gearset having a sun gear driveably connected to the accessory drive means, a ring gear, a carrier and planet pinions rotatably mounted on the carrier, fixed to the engine crankshaft, meshing with the sun gear and with the ring gear;
    means for holding the ring gear against rotation; and
    a starter motor and first clutch means for providing a one-way driving connection between the motor and the accessory drive means.

2. The system of claim 1 further comprising a starter motor and first clutch means for providing a one-way driving connection between the motor and the sun gear.

3. The system of claim 1 wherein the holding means includes a first overrunning clutch for connecting its input to a nonrotating output.

4. The system of claim 3 wherein the input of the first clutch has its input connected to the ring gear and its output fixed against rotation.

5. The system of claim 1 wherein the holding means includes
    a source of hydraulic pressure;
    a cylinder hydraulically connected to a source of pressurized fluid;
    a piston working within the cylinder;
    a caliper brake actuated by the piston connected to the ring gear, engaged and disengaged as the cylinder is pressurized and vented.

6. The system of claim 5 further including:
    pressure sensing means for producing an output electrical signal representative of the magnitude of pressure in the cylinder;
    speed sensing means for producing an output electrical signal representative of the speed of the engine;
    means for connecting the cylinder to the hydraulic pressure source and for venting the cylinder; and
    means adapted to receive the output of the pressure sensing means and the speed sensing means for producing a signal supplied to the connecting and venting means, whereby the signal is employed to connect the pressure source and the cylinder provided the engine speed is equal to or greater than a predetermined engine speed and the hydraulic pressure is equal to or greater than a predetermined pressure, and to vent the cylinder provided the engine speed is less than the predetermined speed or the hydraulic pressure is less than the predetermined pressure.

7. The system of claim 5 further comprising:
    a pivotably mounted lever connected to the piston; and
    a brake actuator connected to the lever radially inward of the connection of the piston and the lever and connected to the caliper brake, whereby the pressure force developed on the piston is amplified and applied to the brake.

8. The system of claim 1 wherein the holding means includes:
    a second clutch means whose input is connected to the ring gear and whose output is fixed gainst rotation for providing a one-way driving connection between the ring gear and its output; and
    a brake connected to the ring gear and engaged when the engine oil pressure equals or exceeds a predetermined magnitude.

9. The system of claim 1 further comprising:
    a source of electrical power connected to the starter motor;
    an engine speed sensing means;
    an ignition switch having a first position at which the electrical power source is connected to the starter motor; and a second position at which the electrical power source may be connected to the starter motor;
    an accelerator actuated manually by the vehicle operator; and
    switching means for connecting the starter motor to the electrical power source provided the ignition switch is in its second position, engine speed is relatively low and the accelerator is actuated, and for disconnecting the starter motor and the electrical power source if the engine speed rises above a predetermined speed.

10. The system of claim 1 further comprising means for driving the engine camshaft and wherein the carrier is connected to the engine crankshaft and to the camshaft driving means.

11. The system of claim 10 wherein the camshaft driving means includes:
    a sprocket wheel;
    a third overrunning, one-way clutch; and
    an endless belt engaged with the sprocket wheel and driveably connected to the engine camshaft.

* * * * *